(12) United States Patent
Cross et al.

(10) Patent No.: US 12,179,411 B2
(45) Date of Patent: Dec. 31, 2024

(54) SYSTEM AND METHOD FOR FORMING TEXTURED BLADDER

(71) Applicant: NIKE, Inc., Beaverton, OR (US)

(72) Inventors: John Cross, Portland, OR (US); Dervin A. James, Hillsboro, OR (US); Ryan R. Larson, Portland, OR (US); Kevin C. Sze, Portland, OR (US); Adam Thuss, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/965,374

(22) Filed: Oct. 13, 2022

(65) Prior Publication Data

US 2023/0116987 A1 Apr. 20, 2023

Related U.S. Application Data

(60) Provisional application No. 63/256,389, filed on Oct. 15, 2021.

(51) Int. Cl.
| | | |
|---|---|---|
| *B29C 51/10* | (2006.01) | |
| *B29C 33/42* | (2006.01) | |
| *B29C 51/36* | (2006.01) | |
| *B29C 33/38* | (2006.01) | |
| *B29L 22/02* | (2006.01) | |
| *B33Y 80/00* | (2015.01) | |

(52) U.S. Cl.
CPC ............ *B29C 51/10* (2013.01); *B29C 33/424* (2013.01); *B29C 51/36* (2013.01); *B29C 33/3842* (2013.01); *B29L 2022/025* (2013.01); *B33Y 80/00* (2014.12)

(58) Field of Classification Search
CPC . B29L 2022/025; B29C 33/424; B29C 51/36; B29C 15/12; B29C 33/301; B29C 33/306; B29C 33/0088
See application file for complete search history.

(56) References Cited

U.S. PATENT DOCUMENTS 5,897,814 A * 4/1999 Niemeyer ............ B29D 17/005
264/107
6,119,371 A * 9/2000 Goodwin .............. B29C 66/133
428/69

(Continued)

FOREIGN PATENT DOCUMENTS

EP 1468816 A1 10/2004

OTHER PUBLICATIONS

Stratasys Direct Inc., "Enhance Your Thermoforming Molds with Additive Manufacturing", Retrieved from internet Feb. 16, 2021 <https://www.stratasysdirect.com/applications/forming-tools/enhance-thermoforming-molds-additive-manufacturing>.

(Continued)

*Primary Examiner* — Alison L Hindenlang
*Assistant Examiner* — Keran V Nguyen
(74) *Attorney, Agent, or Firm* — Honigman LLP; Matthew H. Szalach; Jonathan P. O'Brien

(57) ABSTRACT

A method including inserting into a mold a first tool having a first surface. The method further includes printing a second tool from a polymer material and inserting the second tool into the first tool. The second tool having a smaller wall thickness than the first tool and including a second surface opposing and in contact with the first surface of the first tool and a third surface formed on an opposite side of the second tool than the second surface.

20 Claims, 14 Drawing Sheets

(56) References Cited

U.S. PATENT DOCUMENTS

| | | | |
|---|---|---|---|
| 6,299,962 B1 * | 10/2001 | Davis | B29C 33/306 |
| | | | 36/129 |
| 6,385,864 B1 | 5/2002 | Sell, Jr. et al. | |
| 6,837,951 B2 | 1/2005 | Rapaport | |
| 7,556,492 B2 * | 7/2009 | Waatti | 425/407 |
| 8,245,378 B2 | 8/2012 | Dean | |
| 8,383,028 B2 | 2/2013 | Lyons | |
| 8,470,113 B2 | 6/2013 | Beye et al. | |
| 9,603,414 B2 | 3/2017 | Taylor et al. | |
| 10,065,383 B2 | 9/2018 | Taylor et al. | |
| 10,413,016 B2 | 9/2019 | Dojan et al. | |
| 10,743,614 B2 | 8/2020 | Hensley et al. | |
| 10,869,524 B2 * | 12/2020 | Ploem | A43B 13/02 |
| 2018/0290342 A1 | 10/2018 | Dikovsky et al. | |
| 2019/0039267 A1 * | 2/2019 | Makover | |
| 2021/0086434 A1 | 3/2021 | James | |

OTHER PUBLICATIONS

European Patent Office (ISA), International Search Report and Written Opinion for PCT App. No. PCT/US2022/046661, mailed Jan. 30, 2023.

\* cited by examiner

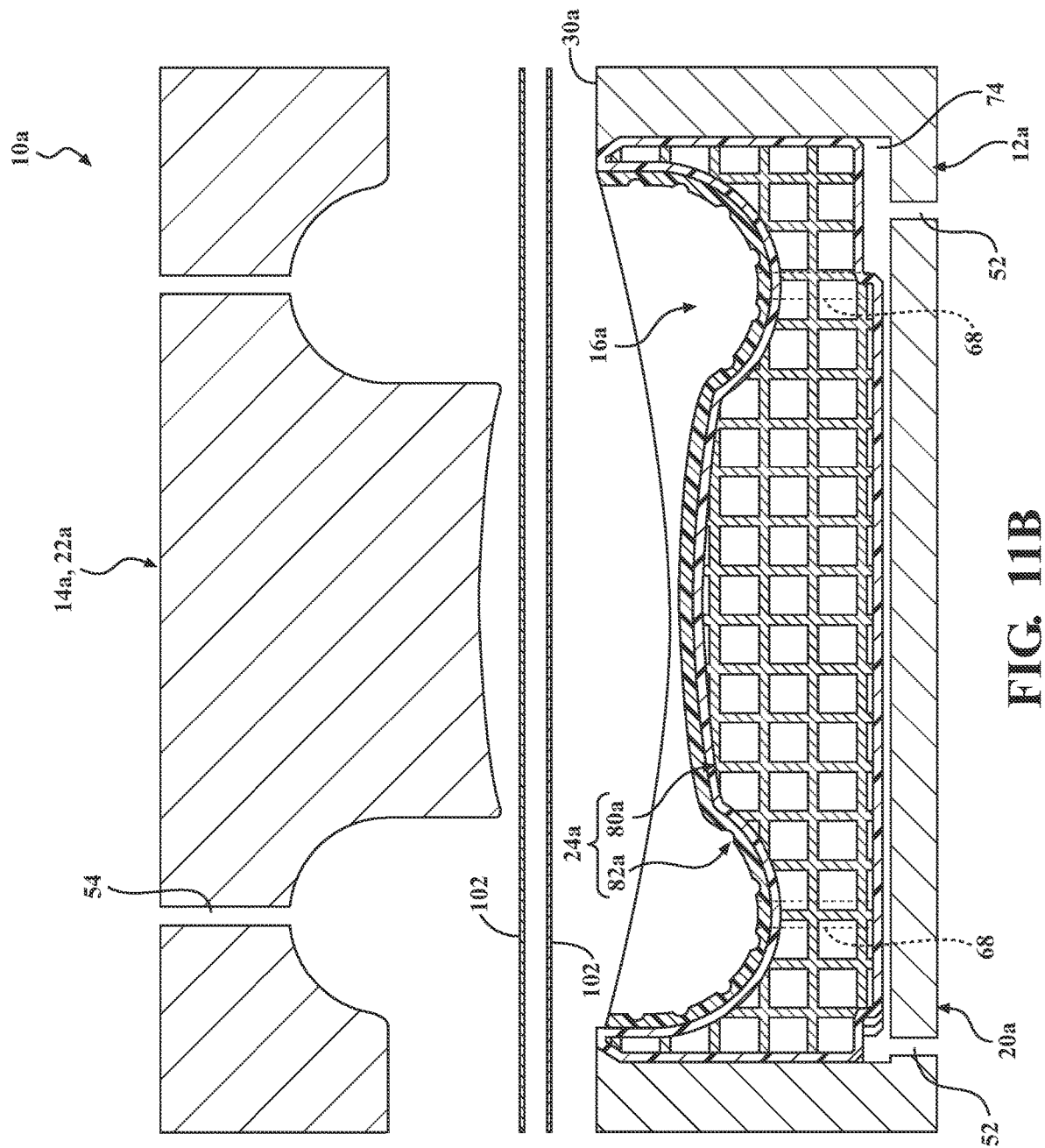

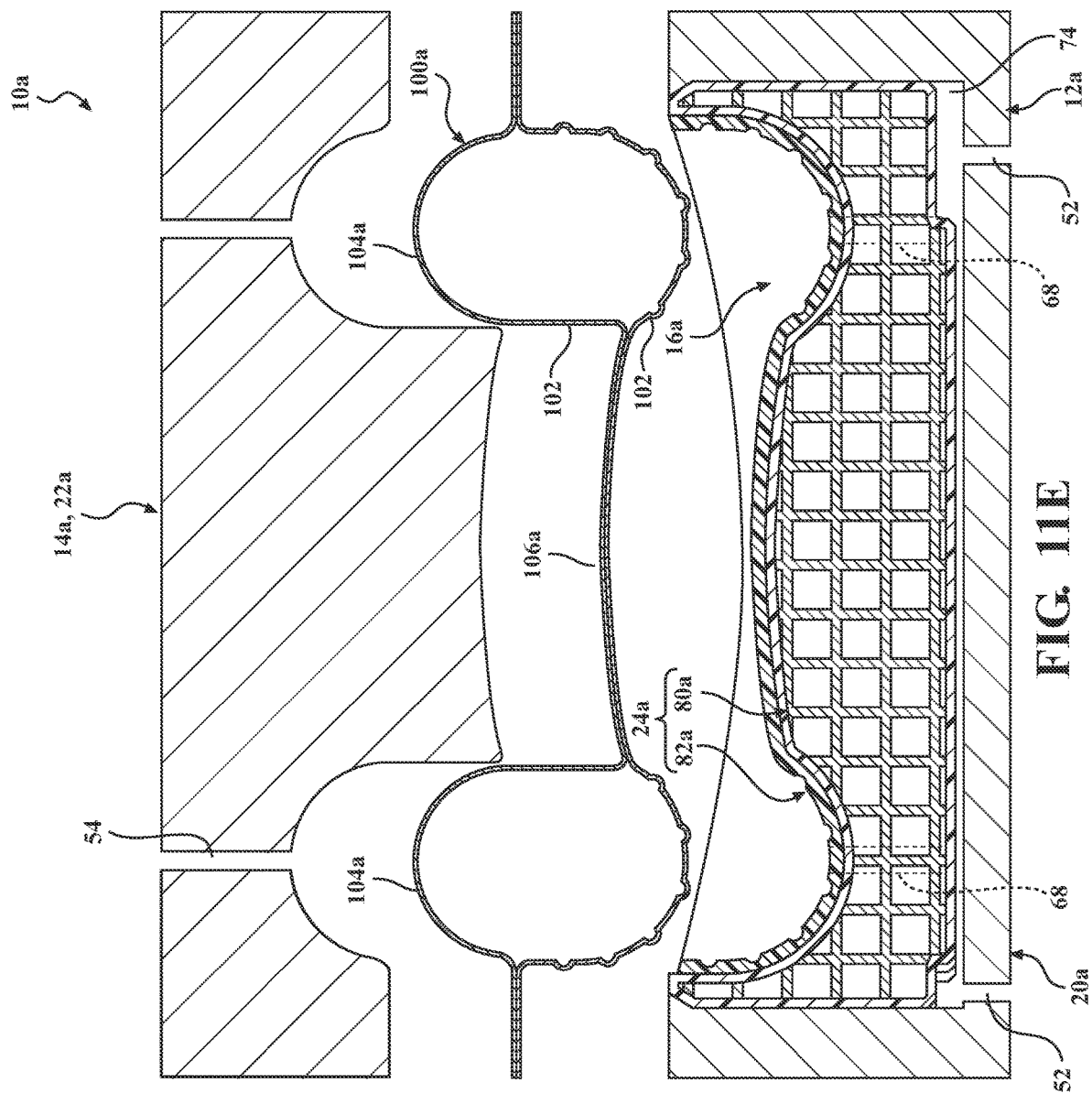

SYSTEM AND METHOD FOR FORMING TEXTURED BLADDER

CROSS REFERENCE TO RELATED APPLICATION

This application claims priority under 35 U.S.C. § 119(e) to U.S. Provisional Application No. 63/256,389, filed on Oct. 15, 2021. The disclosure of this prior application is considered part of the disclosure of this application and is hereby incorporated by reference in its entirety.

FIELD

The present disclosure relates generally to a system and method for forming a textured bladder for an article of footwear.

BACKGROUND

This section provides background information related to the present disclosure and is not necessarily prior art.

Bladders or airbags are used in articles of footwear and apparel to provide cushioning and other performance characteristics during use. Such bladders typically include one or more polymeric films forming an outer layer of the bladder and defining an interior chamber that contains a compressible material, such as a fluid, an elastomeric material, and/or a tensile structure. The fluid and/or elastomeric material provide the bladder with the ability to absorb and cushion forces applied thereto while the tensile member helps maintain a desired shape of the bladder in a relaxed state.

In articles of footwear, bladders are traditionally concealed within a sole structure of the article of footwear to provide cushioning and responsiveness to a wearer during use. Such bladders may be contained within a midsole of the article of footwear and, as a result, are hidden from view. Alternatively, a midsole may include one or more openings where the bladder is visible at a sidewall of the sole structure. Such openings may be so large, in fact, that the bladder forms a majority of a thickness of the sole structure. In such a configuration, a sidewall of the bladder may extend between and join an upper of the article of footwear and a ground-contacting surface of the article of footwear.

Regardless of the particular structure of the bladder and its relationship to other components of the sole structure, the shape, color, and overall appearance of the bladder are typically designed to complement the surrounding structure of the article of footwear to provide the article of footwear with a desired appearance.

DRAWINGS

The drawings described herein are for illustrative purposes only of selected configurations and not all possible implementations, and are not intended to limit the scope of the present disclosure.

FIGS. 11A-11E are schematic views of a method of using a mold system to form a textured bladder according to an example of the present disclosure;

Corresponding reference numerals indicate corresponding parts throughout the drawings.

DETAILED DESCRIPTION

Figure 1:
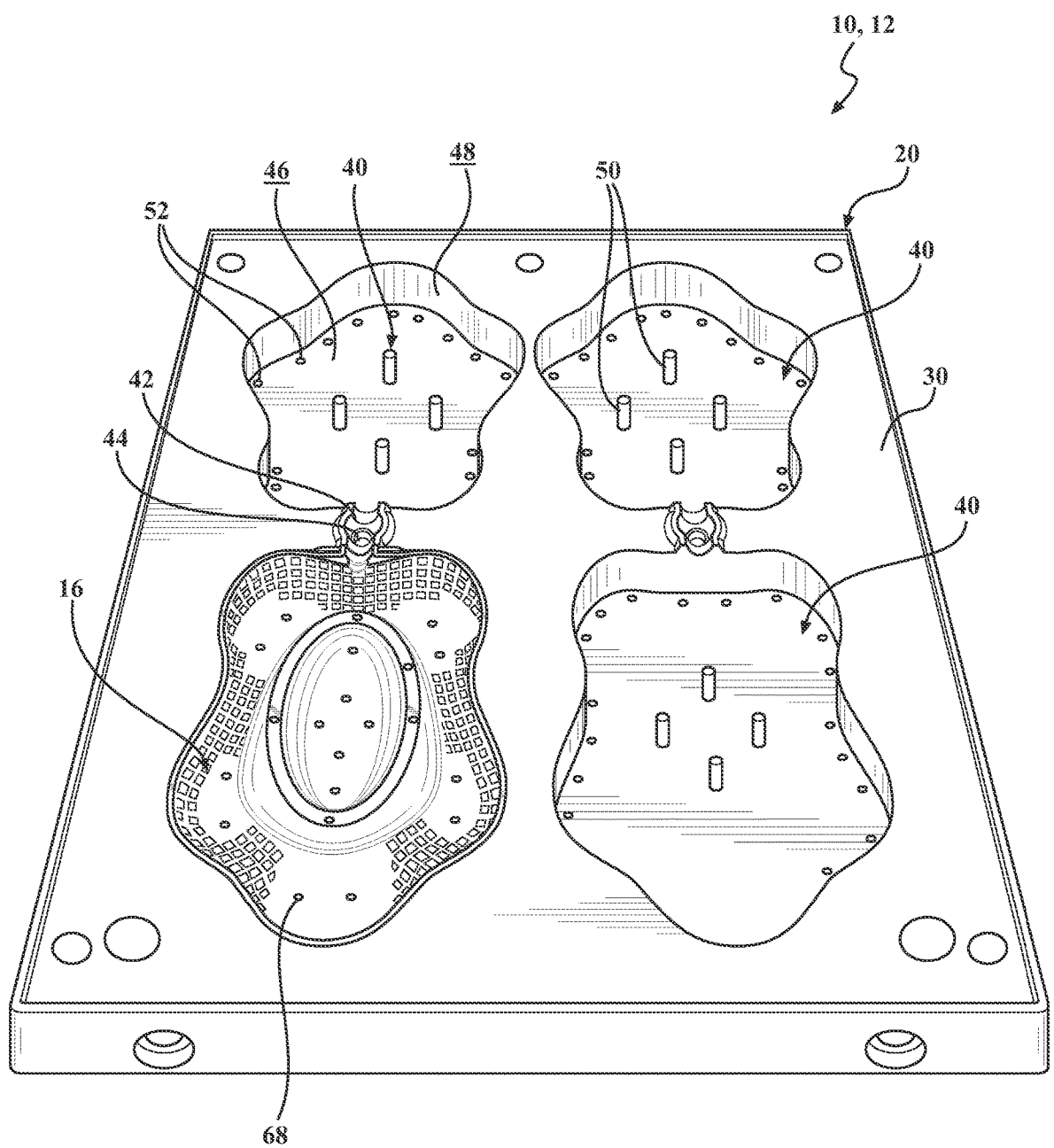
FIG. 1 is a perspective view of an example of a first mold plate of a mold system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The details of one or more implementations of the disclosure are set forth in the accompanying drawings and the description below. Other aspects, features, and advantages will be apparent from the description, the drawings, and the claims.

With reference to FIGS. 1-5, an example mold system 10 for molding a bladder 100 having a textured exterior surface is provided. The mold system 10 includes a first mold 12 and a second mold 14. The first mold 12 defines one or more first mold cavities 16 and the second mold 14 defines one or more second mold cavities 18 that each cooperate with a corresponding one of the first mold cavities 16 to define a respective mold chamber configured to define a shape and surface profile of the bladder 100. In the illustrated example, the first mold 12 includes a first mold plate 20 and the second mold 14 includes a second mold plate 22. The first mold plate 20 is configured to receive an interchangeable mold cartridge 24 that defines the first mold cavity 16, while the second mold plate 22 includes the second mold cavity 18 formed directly in the second mold plate 22. Optionally, the second mold plate 22 may also be configured to receive a mold cartridge similar to the mold cartridge 24 of the first mold plate 20.

Figure 2:
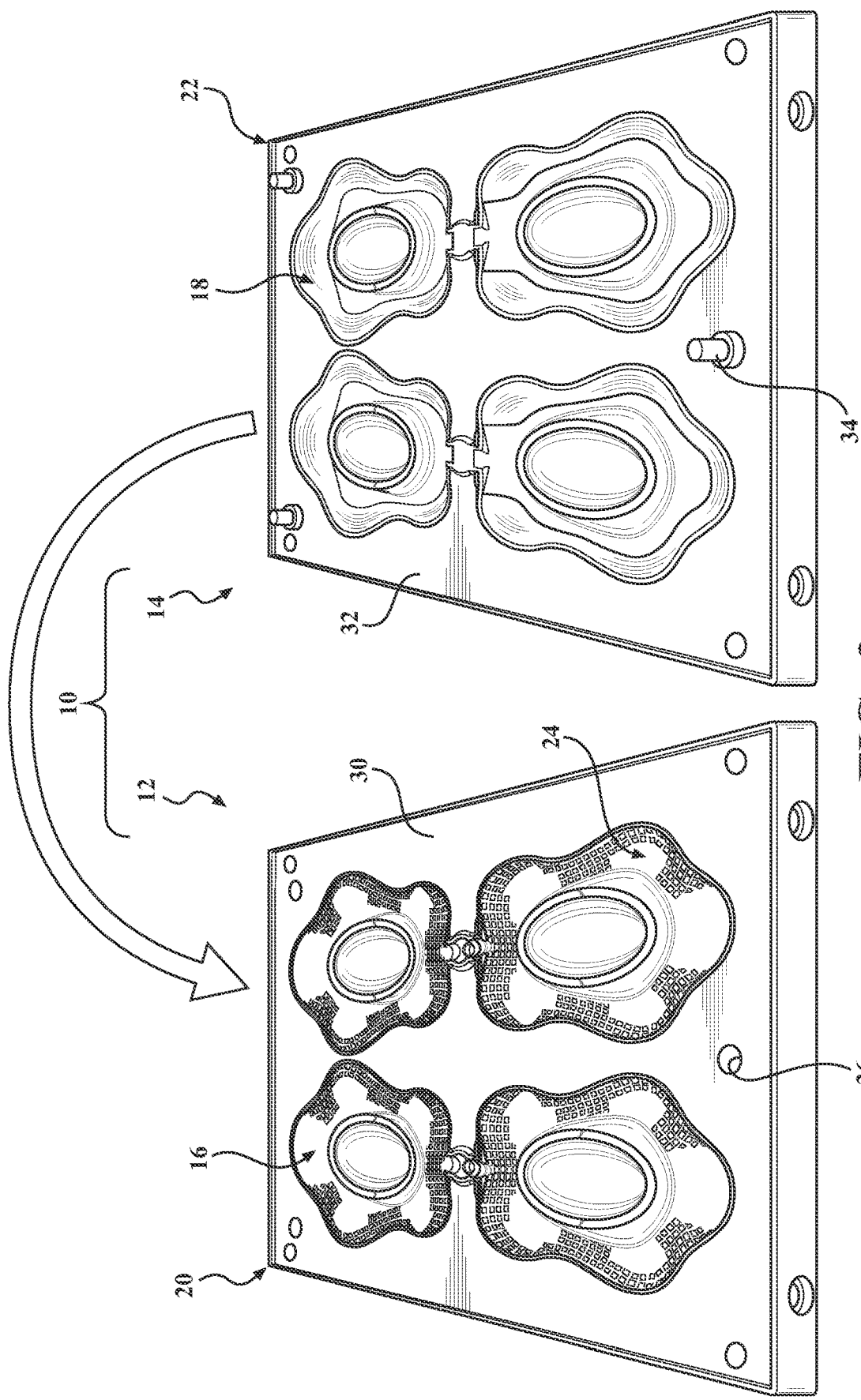
FIG. 2 is a perspective view of the first mold plate and an example of a second mold plate of the mold system according to the present disclosure.

Referring to FIG. 2, the first mold plate 20 includes a first mold face 30 and the second mold plate 22 includes a second mold face 32. The first mold face 30 includes the first mold cavities 16 and the second mold face 32 includes the second mold cavities 18. While the mold plates 20, 22 are shown in an open configuration for clarity, in use the first mold face 30 of the first mold plate 20 faces the second mold face 32 of the second mold plate 22 such that the first mold cavities 16 oppose corresponding ones of the second mold cavities 18. Each of the first mold face 30 and the second mold face 32 may include one or more alignment features, such as a plurality of guide pins 34 extending from one of the mold faces 30, 32 and a plurality of corresponding guide holes 36 formed in the other one of the mold faces 30, 32. The alignment features 34, 36 cooperate to maintain the relative alignment between the first mold cavities 16 and the corresponding second mold cavities 18.

With reference to FIG. 1, the first mold plate 20 includes a plurality of sockets 40 formed in the first mold face 30. In the illustrated example, the first mold plate 20 includes four sockets 40 arranged in tandem such that a first pair of the sockets 40 are connected to each other and a second pair of the sockets 40 are connected to each other. Other examples of the first mold plate 20 may include a single socket 40 or any number of sockets 40 arranged in tandem or individually. In the illustrated example, the two sockets 40 of each pair of sockets 40 are connected to each other by a manifold 42. Optionally, the manifold 42 may include a port 44 for providing pressurized fluid to the first mold cavity 16 when the mold 10 is in a closed position.

Referring still to FIG. 1, the sockets 40 are provided as generic cavities configured to receive one of the mold cartridges 24 that define one of the first mold cavities 16. In the illustrated example, the sockets 40 each include a bottom surface 46 and a peripheral wall 48 extending from the bottom surface 46 to the first mold face 30. The bottom surface 46 is substantially flat and defines a support surface upon which the mold cartridge 24 is supported within the first mold plate 20. The bottom surface 46 may include a plurality of alignment features, such as dowel pins 50 configured to engage the mold cartridge 24 when the mold cartridge 24 is inserted within the socket 40.

The bottom surface 46 of the socket 40 includes one or more vacuum ports 52 configured to interface with a corresponding vacuum port formed in the mold cartridge 24, whereby a vacuum drawn through the vacuum ports 52 is provided within the first mold cavity 16 to draw a barrier film of the bladder 100 against the walls of the first mold cavity 16, as discussed in greater detail below. In the illustrated example, the bottom surface 46 includes a plurality of vacuum ports 52 arranged in series along the bottom surface 46 adjacent to the peripheral wall 48.

The peripheral wall 48 of the illustrated example extends substantially perpendicular from the bottom surface 46 to the first mold face 30 such that the socket 40 has a constant cross-sectional area and profile from the bottom surface 46 to the first mold face 30. In the illustrated example, the peripheral wall 48 defines a star-shaped profile including a plurality of convex lobes arranged in series around the outer periphery. As shown in FIG. 1, the star-shaped or lobed profile corresponds to a peripheral profile of the lobed profile of the first mold cavity 16 defined by the mold cartridge 24. However, in other examples, the socket 40 may have a peripheral profile is that is not directly associated with the profile of the first mold cavity 16. For example, the socket 40 may have a rectangular or oval-shaped peripheral profile, while the first mold cavity 16 may have a different shape (e.g. lobed, U-shaped). Furthermore, the sockets 40 may have a tapered profile, whereby the peripheral wall 48 is oriented at an oblique angle relative to the bottom surface 46 such that the cross-sectional area and profile of the socket 40 tapers along the direction from the first mold face 30 to the bottom surface 46.

Figure 7:
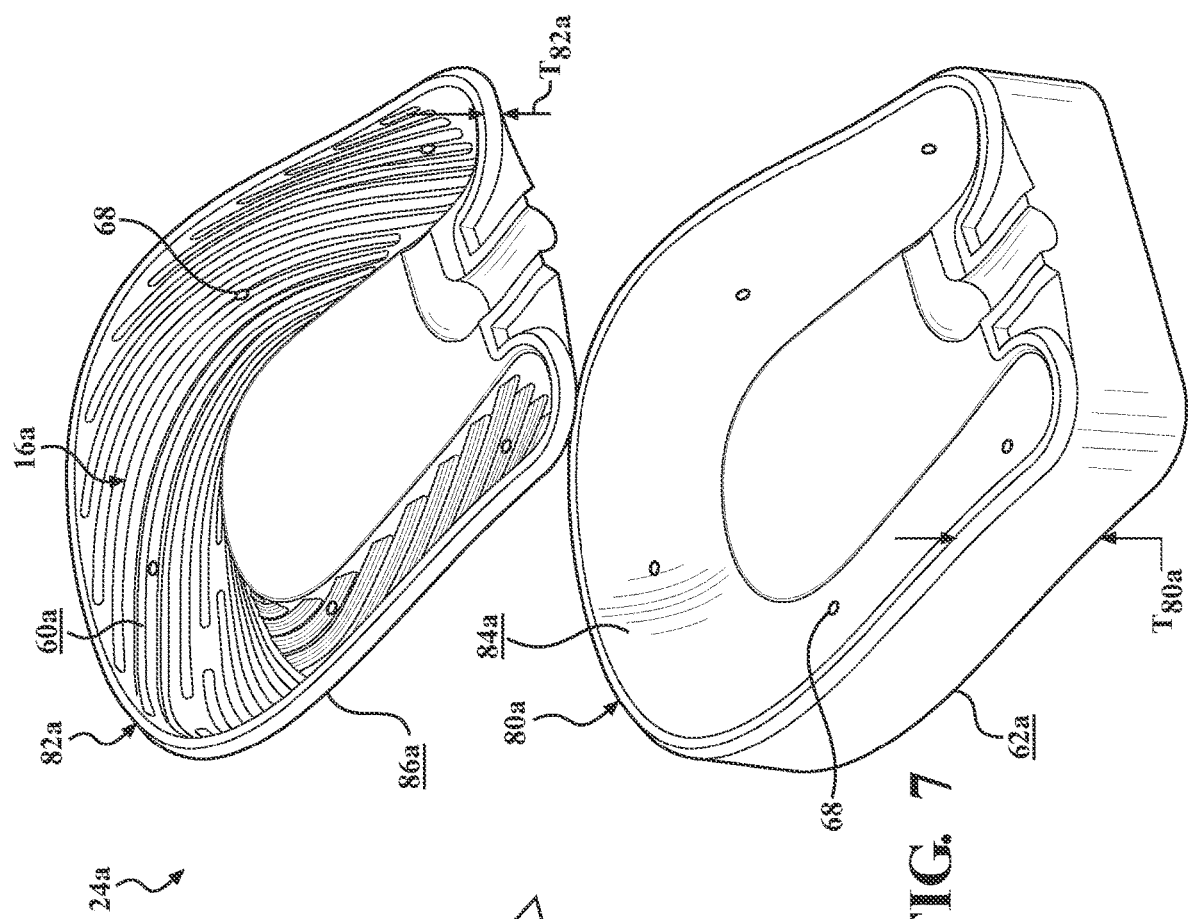
FIG. 7 is an exploded view of the mold cartridge of FIG. 6.

Referring to FIGS. 3-6, an example of a generic mold cartridge 24 according to the present disclosure is provided. As previously discussed, the mold cartridge 24 is configured to be selectively inserted into one of the sockets 40 of the first mold plate 20 and defines the first mold cavity 16. Accordingly, a first mold cartridge 24a (e.g., FIGS. 6 and 7) can be interchanged with a second mold cartridge 24b (e.g. FIGS. 9 and 10) to provide the first mold plate 20 with a first mold cavity 16 having a different shape or profile.

The mold cartridge 24 includes a first mold cavity surface 60 formed on a first side of the mold cartridge 24, a base surface 62 formed on an opposite side of the mold cartridge 24 than the first mold cavity surface 60, and a peripheral surface 64 extending from the first mold cavity surface 60 to the base surface 62. As shown, the peripheral surface 64 of the mold cartridge 24 has a profile and size corresponding to the peripheral wall 48 of the socket 40, such that the mold cartridge 24 is configured to mate with the socket 40. Accordingly, the peripheral surface 64 may have the same profile as the peripheral wall 48 and define a slightly smaller cross-sectional area than the peripheral wall 48 to provide a clearance fit or transitional fit between the mold cartridge 24 and the socket 40.

The first mold cavity surface 60 (FIG. 4) defines the first mold cavity 16 and can have any profile according to a desired shape of the bladder 100 to be formed in the mold 10. As discussed below with respect to the examples of FIGS. 6-10, the first mold cavity surface 60 may define a surface profile including a desired surface pattern to be formed on an exterior surface of the bladder 100. The base surface 62 (FIG. 3) has a substantially flat profile configured to interface with the bottom surface 46 of the socket 40 when the mold cartridge 24 is inserted within the socket 40. The base surface 62 may include one or more alignment features, such as dowel holes 66 configured to receive the dowel pins 50 extending from the bottom surface 46 of the socket 40.

As previously introduced, the mold cartridge 24 includes a plurality of vacuum ports 68 configured to communicate with the vacuum ports 52 formed in the bottom surface 46 of the socket 40. The vacuum ports 68 extend through the thickness of the mold cartridge from the base surface 62 to the first mold cavity surface 60. Thus, a negative pressure provided to the vacuum ports 52 of the socket 40 is communicated through the vacuum ports 68 of the mold cartridge 24 to the first mold cavity 16.

Figure 3:
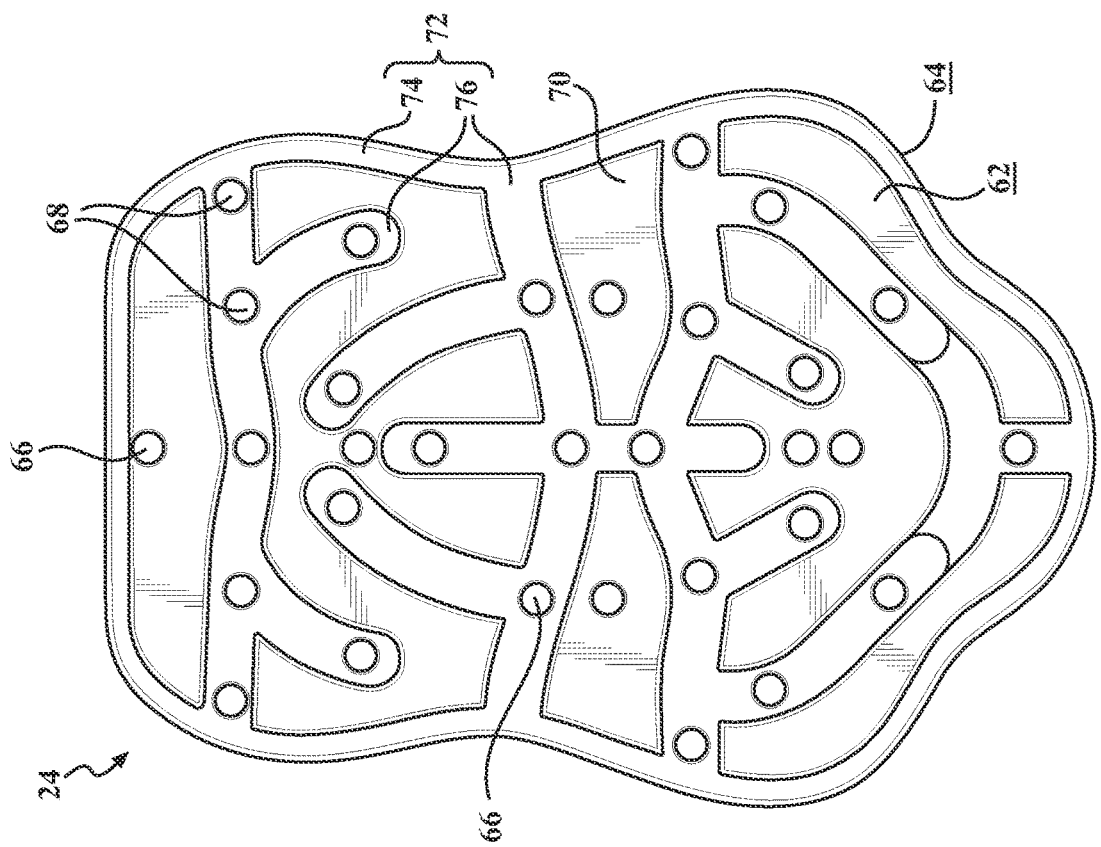
FIG. 3 is a bottom plan view of an example of a mold cartridge for the first mold plate according to the present disclosure.

As shown in FIG. 3, the base surface 62 of the mold cartridge 24 may include a plurality of ribs 70 protruding therefrom. The ribs 70 cooperate to define a vacuum manifold 72 between the ribs 70 on the base surface 62 of the mold cartridge 24. The vacuum manifold 72 is configured to distribute the negative pressure provided by the vacuum ports 52 of the socket 40 to each of the vacuum ports 68 of the mold cartridge 24. For example, the vacuum manifold 72 includes a peripheral channel 74 formed in the base surface 62 adjacent to the peripheral surface 64. When the mold cartridge 24 is inserted within the socket 40, the peripheral channel 74 communicates directly with the plurality of the vacuum ports 52 arranged along the peripheral wall 48 of the socket 40. Thus, the vacuum ports 52 of the socket 40 are in direct communication with the peripheral channel 74.

Figure 4:
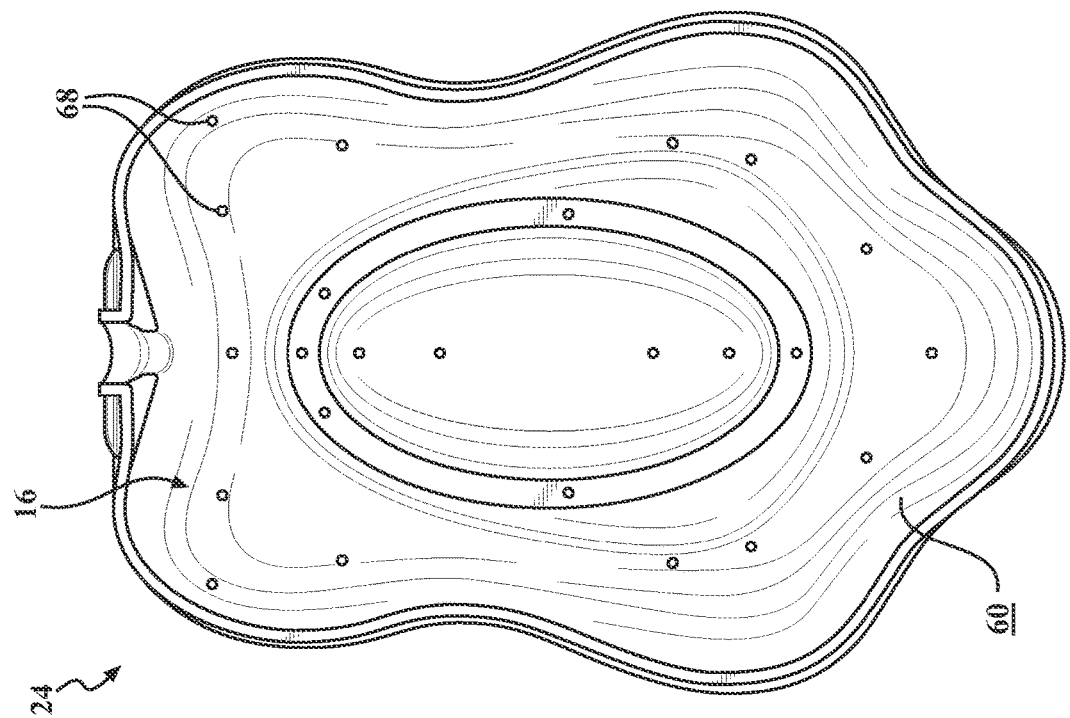
FIG. 4 is a top plan view of the mold cartridge of FIG. 3.

With continued reference to FIG. 3, the vacuum manifold 72 further includes a network of interior channels 76 connected to the peripheral channel 74. Each of the interior channels 76 includes an outlet end of at least one of the vacuum ports 68 of the mold cartridge 24. Accordingly, when the mold cartridge 24 is inserted within the socket 40, the negative pressure drawn by the vacuum ports 52 of the socket 40 is distributed to the vacuum ports 68 of the mold cartridge 24 via the peripheral channel 74 and the interior channels 76 to ensure even pressure distribution among all of the vacuum ports 68 of the mold cartridge 24. As shown in FIG. 4, each of the vacuum ports 68 formed in the mold cartridge 24 extends through the first mold cavity surface 60 to provide fluid communication with the first mold cavity 16.

Figure 5:
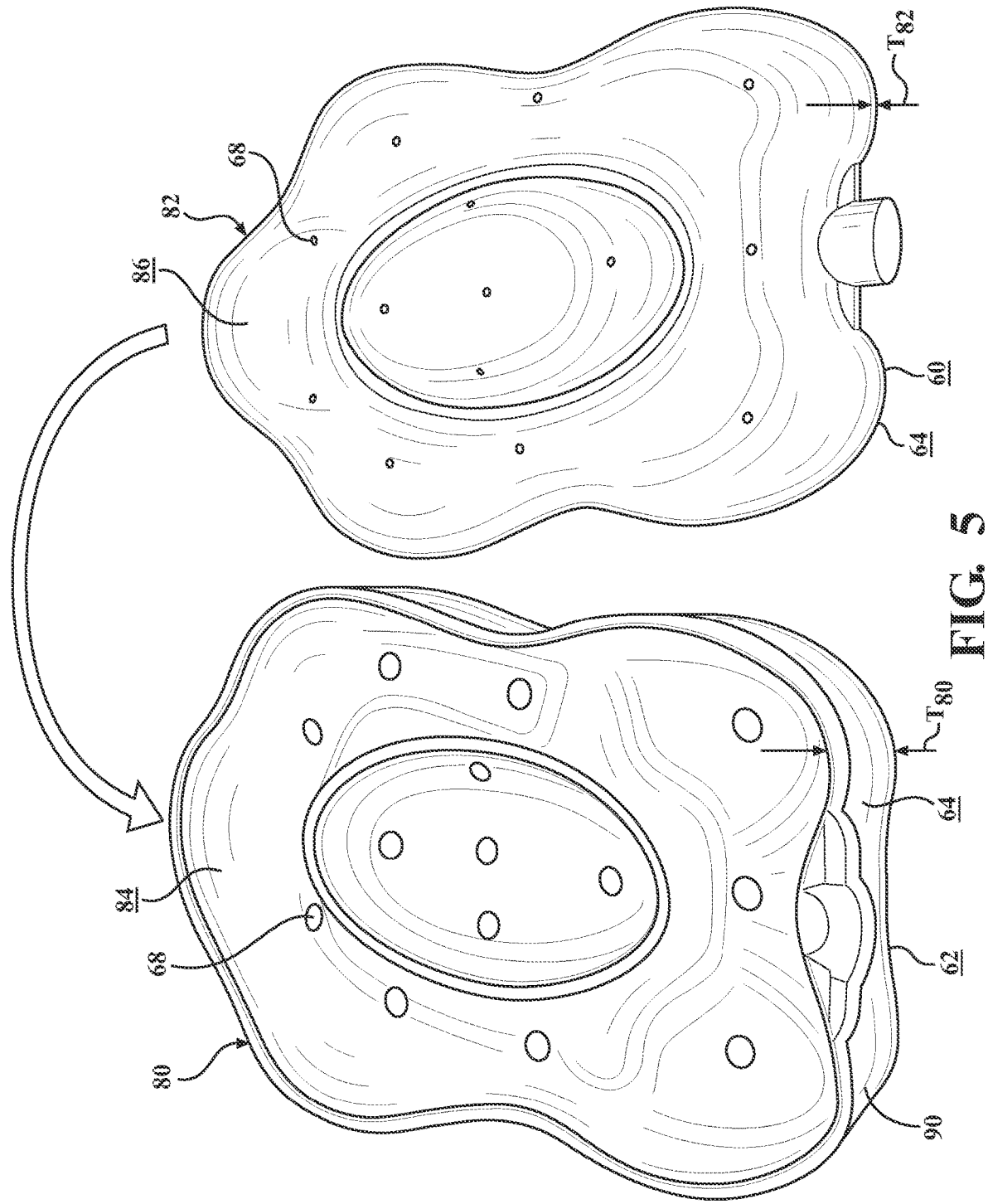
FIG. 5 is an exploded view of the mold cartridge of FIG. 3.
Figure 6:
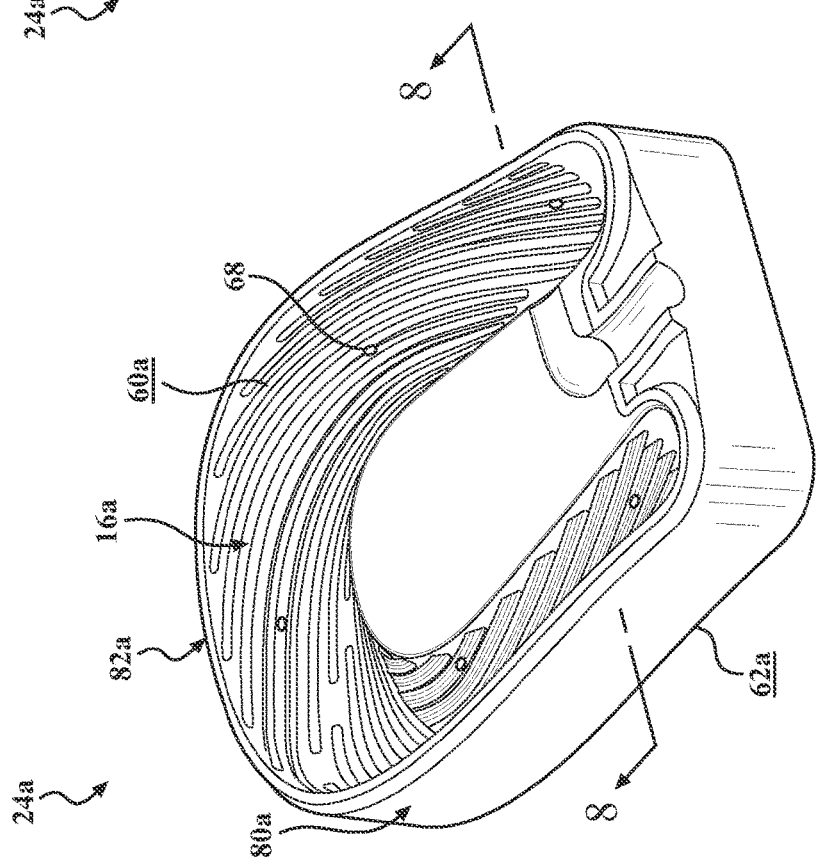
FIG. 6 is a perspective view of another example of a mold cartridge for a mold system according to the present disclosure.

Referring now to FIGS. 5 and 6, the construction of an example of the mold cartridge 24 is detailed. In some examples, the mold cartridge 24 may be formed as a unitary and/or homogenous structure including a single piece defining the entire structure. However, in the present example, the mold cartridge 24 is provided as a modular structure including an inner mold tool or a base 80 and an outer mold tool or an insert 82. The base 80 includes the base surface 62 on a first side and a receiving surface 84 formed on an opposite side of the base 80 than the base surface 62. A distance from the base surface 62 to the receiving surface 84 defines a thickness $T_{80}$ of the base 80. The insert 82 includes the first mold cavity surface 60 formed on a first side of the insert 82 and a mating surface 86 formed on an opposite side of the insert 82 from the first mold cavity surface 60. A distance from the first mold cavity surface 60 to the mating surface 86 defines a thickness $T_{92}$ of the insert 82, which is less than the thickness $T_{80}$ of the base 80.

Figure 10:
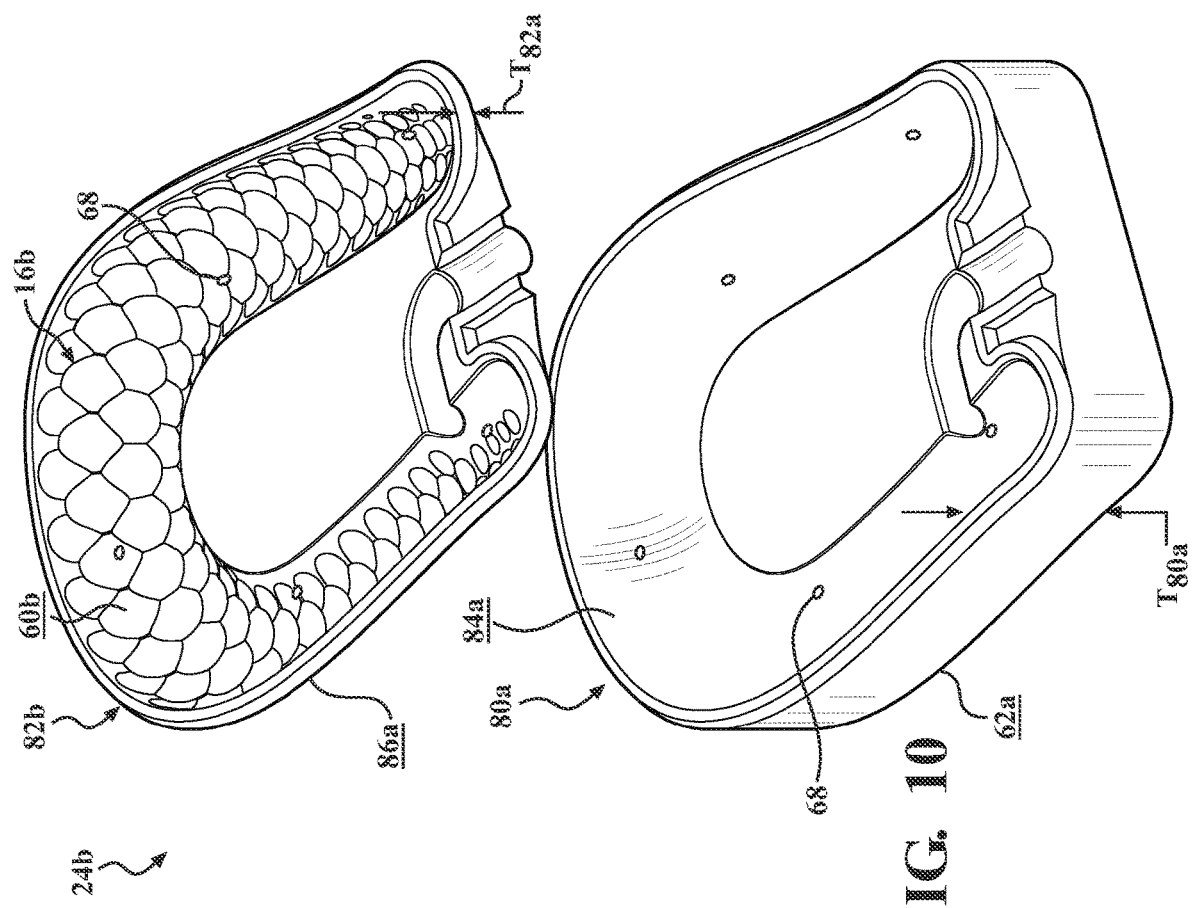
FIG. 10 is an exploded view of the mold cartridge of FIG. 9.
Figure 9:
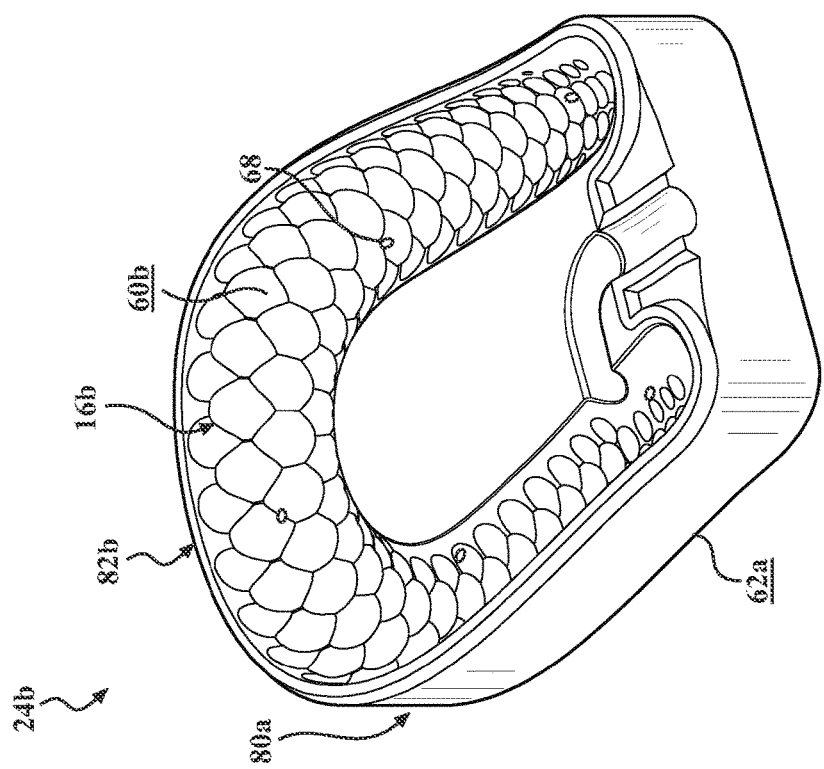
FIG. 9 is a perspective view of another example of a mold cartridge for a mold system according to the present disclosure.

The insert 82 is configured to be removably received within the base 80, thereby allowing the first mold cavity surface 60 to be interchangeable within the mold cartridge 24. For example, an insert 82 including a first mold cavity surface 60 having a first surface pattern (FIGS. 6 and 7) may be interchanged with an insert 82 including a first mold cavity surface 60 having a different surface pattern (FIGS. 9 and 10). Each insert 82 includes portions of the vacuum ports 68 formed therethrough in the same locations such that when the inserts 82 are mated with the base 80, the portions of the exhaust ports 68 formed in the insert 82 are aligned with the portions of the exhaust ports 68 formed through the base 80.

The examples of the present disclosure easily allow a single mold system 10 to be used to form a plurality of bladders 100 having different sizes, shapes, and/or surface characteristics. For example, providing a first mold plate 20 with a standard socket 40 configured to receive a standard base 80 including interchangeable inserts 82 allows a single mold system 10 to be easily adapted for forming different bladders 100 without requiring inventories of different mold plates. Furthermore, customized versions of the inserts 82 can be quickly manufactured using additive manufacturing, thereby eliminating the need to develop and manufacture expensive tooling. This is particularly beneficial for forming bladders 100 having relatively small production runs where it is not cost-effective to develop and manufacture a unique mold plate.

With reference to FIGS. 6-10, an example of a mold cartridge 24a according to the present disclosure is shown. Here, the mold cartridge 24a is shown in a first configuration including a first insert 82a (FIGS. 6-8) and a second insert 82b (FIGS. 9 and 10) interchangeably installed in a standard base 80a. The mold cartridge 24a has substantially similar construction to the mold cartridge 24 discussed with respect to FIGS. 1-5, except that the shapes of the base 80a and the inserts 82a, 82b are different than those of the base 80 and insert 82 discussed previously. As discussed previously, the example of the mold cartridge 24a has a U-shaped first mold cavity 16a, 16b for forming a bladder having a corresponding U-shape.

While the peripheral shape of the mold cartridge 24a is different than that of the mold cartridge 24 shown in FIGS. 1-5, the general construction is substantially similar. For example, in the first configuration (FIGS. 6-8), the mold cartridge 24a includes a first mold cavity surface 60a defining the first mold cavity 16a, a substantially flat base surface 62a formed on an opposite side than the first mold cavity surface 60a, and a peripheral surface 64a formed perpendicular to the base surface 62a and defining the peripheral profile of the mold cartridge 24a.

As with the mold cartridge 24, the mold cartridge includes the base 80a including the base surface 62a and a receiving surface 84a disposed on an opposite side from the base surface 62a. The distance between the base surface 62a and the receiving surface 84a defines a thickness $T_{80a}$ of the base 80a. The insert 82a includes the first mold cavity surface 60a and a mating surface 86a formed on an opposite side than the first mold cavity surface 60a. The distance between the first mold cavity surface 60a and the mating surface 86a defines a thickness $T_{82a}$ of the insert 82a, which is less than the thickness $T_{80a}$ of the base 80a.

In some examples, the thickness $T_{82a}$ of the insert 82a may be constant, such that the insert 82a merely provides a removable layer upon the receiving surface 84a of the base 80a. Optionally, the first mold cavity surface 60a is configured with a textured profile including a desired pattern to be formed in the exterior surface of the bladder 100. For example, the first mold cavity surface 60a has a profile including a plurality of parallel ribs and channels. However, any desired profile may be provided by the first mold cavity surface 60a. FIGS. 9 and 10 show an example configuration of the mold cartridge 24b, where the insert 82a shown in FIGS. 6 and 7 has been replaced with a different insert 82b including a first mold cavity surface 60b defining a different surface pattern. Specifically, the insert 82b includes a first mold cavity surface 60b defining a plurality of scales. In this example, the insert 82b has the same thickness $T_{82a}$ as the insert 82a. As discussed below, the inserts 82a, 82b may be quickly interchanged within the base 80 to change the size, shape, or surface pattern of the first mold cavity 16, 16a, 16b.

Figure 8:
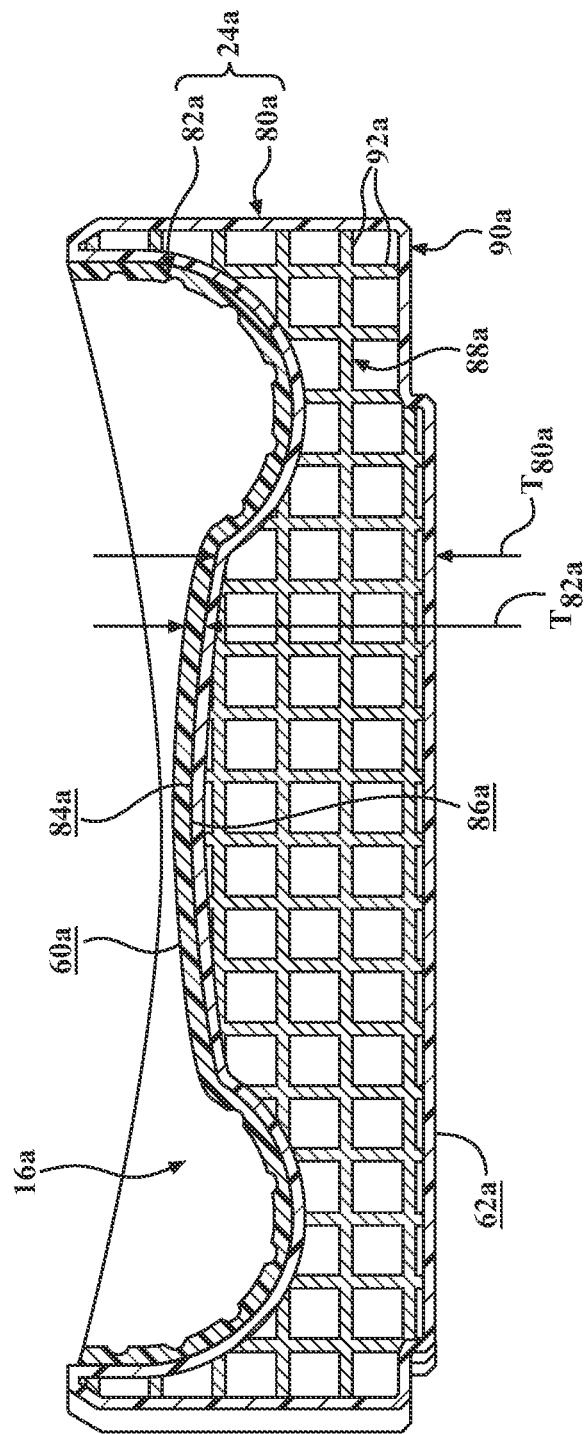
FIG. 8 is an example cross section of the mold cartridge of FIG. 6, taken along Line 8-8 in FIG. 6.

With reference to FIG. 8, a cross-sectional view of the mold cartridge 24a shows internal construction of the base 80a and the insert 82a. As shown, the base 80a may be constructed as a composite structure including a core 88a having a first material and/or structure and a shell 90a having a second material and/or structure. For example, the core 88a may include a lattice structure including a network of interconnected segments defining a plurality of interior voids. The lattice structure may be formed of a metallic material to provide structural integrity to the core 88a. While the core 88a includes lattice structure having a regular and repeating arrangement of segments, the core 88a may be configured within any configuration of segments. For example, spacing, orientation, length, and/or diameter of the segments may vary within the core 88a to provide the core 88a with regions having different densities and strengths. While the base construction including the core 88a and shell 90a are shown with respect to the example of the cartridge 24a, it will be appreciated that any one of the examples of cartridges 24-24b may include a base 80-80a having a similar composite structure.

The base 80a further includes the shell 90a provided over an exterior of the core 88a to form a solid exterior surface of the base 80a. The shell 90a may be formed of a polymeric material and may be applied to the exterior of the core 88a using additive manufacturing processes (e.g., three-dimensional printing). Likewise, the inserts 82-82b may be formed using additive manufacturing and, due to their relatively thin-walled construction, require a minimal amount of time and material to form, thereby allowing different inserts 82-82b to be quickly and inexpensively formed. Accordingly, the shells 90, 90a of the bases 80, 80a and the inserts 82-82b may be quickly manufactured with different sizes, shapes, and surface profiles to allow the same mold system 10 to be used to form a variety of configurations of bladders 100.

Referring to FIGS. 11A-11E, a method of forming a bladder 100 using an example of a mold system 10a according to the present disclosure is provided. In one step, shown in FIG. 11A, a first mold 12a is assembled. The first mold 12a includes a first mold plate 20a having a single socket 40a including a bottom surface 46a and a peripheral surface 48a, where the bottom surface 46a includes a plurality of the vacuum ports 52. The first mold 12a further includes the mold cartridge 24a described above with respect to FIGS. 6-10. The base 80a of the mold cartridge 24a is inserted into the socket 40a such that the base surface 62a contacts the bottom surface 46a and the peripheral surface 64a mates with the peripheral wall 48a. The insert 82a is mated with the base 80a by placing the mating surface 86a of the insert 82a in contact with the receiving surface 84a of the base 80a.

With reference to FIG. 11B, a cross-sectional view of the first mold 12a is shown in the assembled state. The mold system 10a is also shown with the second mold 14a, which includes the second mold plate 22a. While the second mold 14a may be configured as a modular mold in the same manner as the first mold 12a, the second mold 14a of the illustrated example is provided as a unitary mold having the second mold cavity 18a directly defined by the second mold plate 22a. With the mold system 10 configured in an open configuration (i.e., first mold face 30a spaced apart from the second mold face 32a), a pair of barrier sheets 102 are provided between the opposing mold faces 30a, 32a.

Figure 11A:
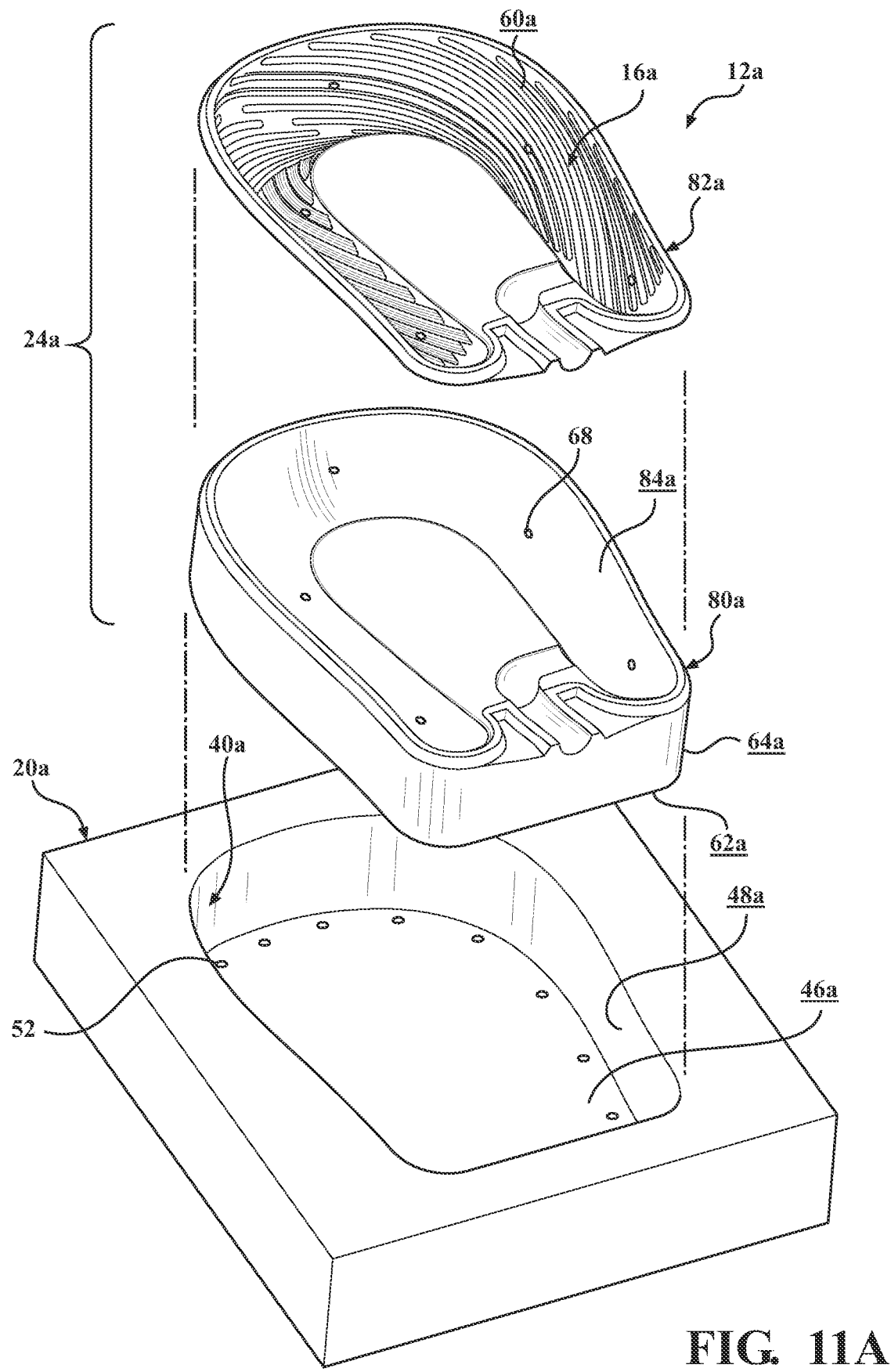
Figure 11C:
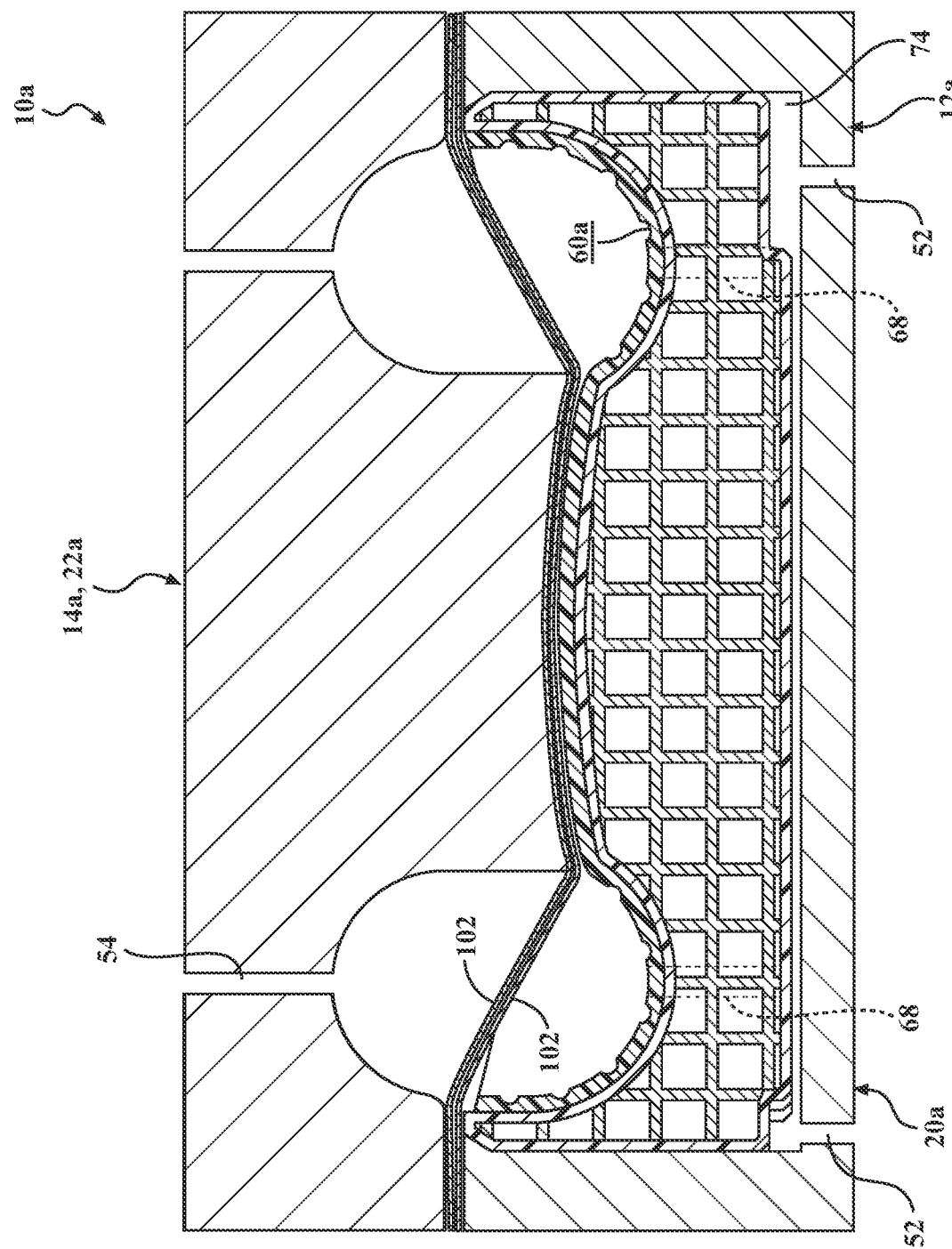
Figure 11D:
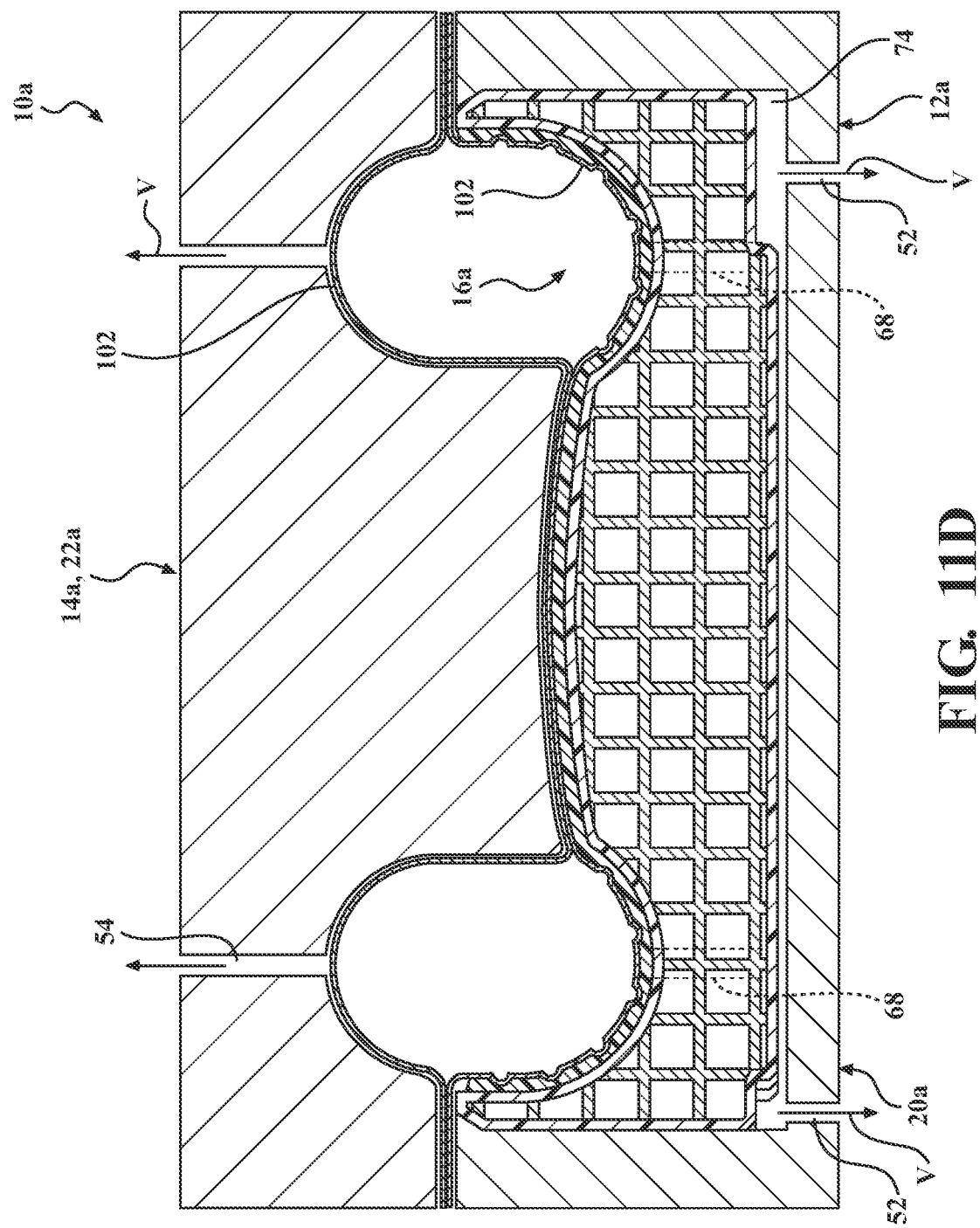

In FIG. 11C, the mold system 10a is moved to the closed configuration (i.e., first mold face 30a is adjacent to the second mold face 32a). Here, the two barrier sheets 102 are compressed between the opposing mold faces 30a, 32a to form a seal between the barrier sheets 102. At FIG. 11D, a vacuum V is drawn through the network of vacuum ports 52, 68 formed in the first mold plate 22a and the mold cartridge 24a to draw a first one of the barrier sheets 102 against the first mold cavity surface 60a defined by the insert 82a. Likewise, a vacuum V may be drawn through vacuum ports 54 formed in the second mold plate 22 to draw the second one of the barrier sheets 102 against the mold surface defining the second mold cavity 18a. Optionally, heat may be applied to the mold cavities 16a, 18a to soften the material of the barrier sheets 102, thereby allowing the barrier sheets 102 to stretch within the mold cavities 16a, 18a and conform to the mold cavity surfaces 60a. Thus, the pattern formed by textured profile of the first mold cavity surface 60a will be imparted to an exterior surface of the first one of the barrier sheets 102 under the influence of heat and negative pressure (i.e., vacuum).

Figure 12:
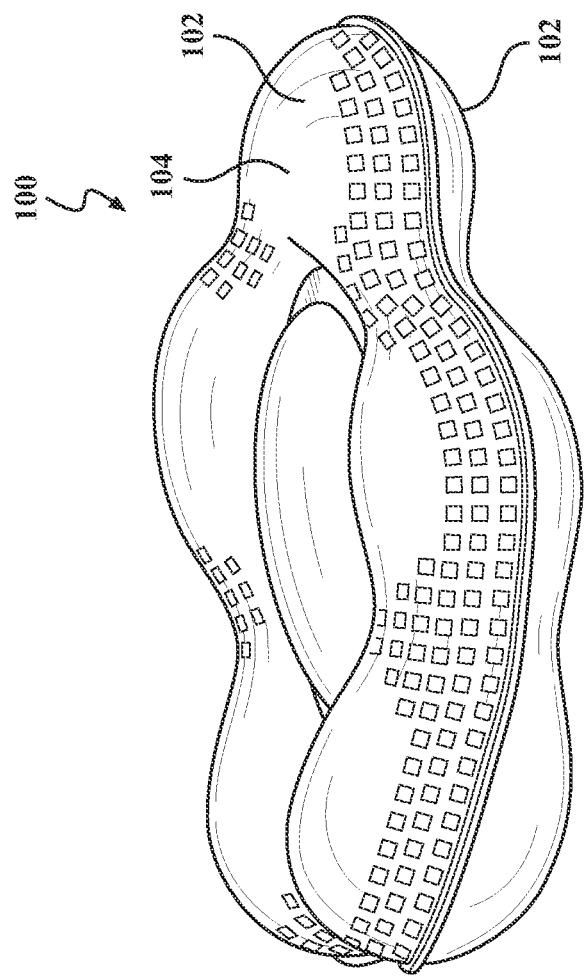
FIG. 12 is a perspective view of an example of a bladder having a textured surface according to the present disclosure.
Figure 13:
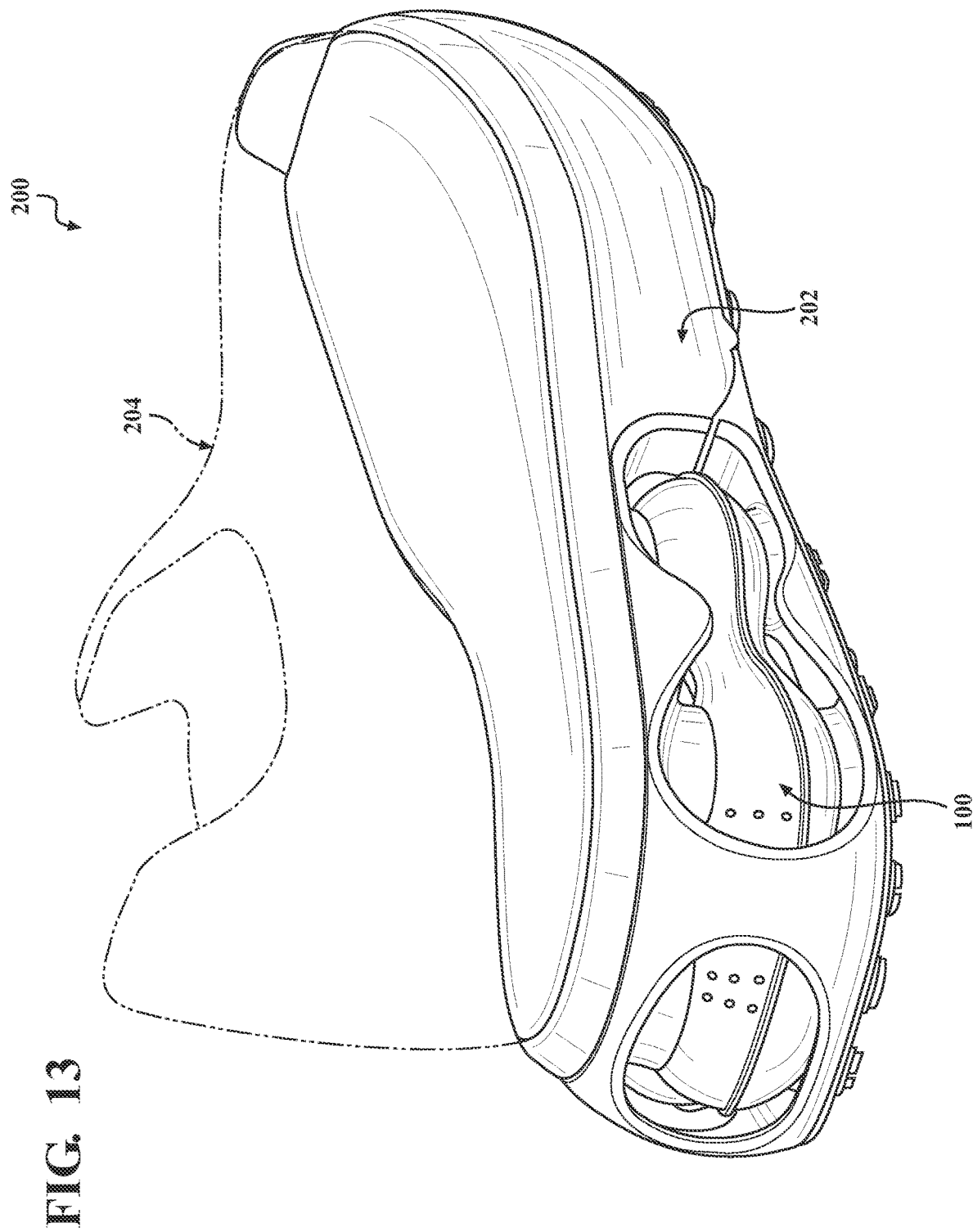
FIG. 13 is an example of an article of footwear including a textured bladder according to the present disclosure.

In FIG. 11E, the mold system 10a is returned to the open configuration and the bladder 100a is removed. While the illustrated mold system 10a is configured for forming a bladder 100a having a U-shaped chamber 104a and a web area 106a, the principles of the present disclosure may be used for forming any shape of bladder having a textured exterior surface. For example, FIGS. 12 and 13 provide an example of the bladder 100 having an embossed exterior surface formed using the mold system 10 of FIGS. 1-5. As shown, the bladder 100 includes two barrier sheets 102 joined together in discrete areas to form a chamber 104 defining an interior void. The interior void may include a pressurized fluid. In this example, only one of the barrier sheets 102 includes the textured exterior surface imparted by the modular first mold 12 shown in FIG. 1, while the second barrier sheet 102 includes a smooth exterior surface defined by the unitary second mold 14 shown in FIG. 2. However, as discussed above, the mold system 10 may be provided with two modular molds such that both of the barrier sheets 102 can be formed with textured surfaces.

FIG. 13 shows an example of an article of footwear 200 including the bladder 100 disposed within a sole structure 202. However, the principles of the present disclosure may be used for forming bladders used in other parts of the article of footwear, such as in a forefoot region or midfoot region of the sole structure 202 or along an upper 204 of the article of footwear 100.

The following Clauses provide an exemplary configuration for a method of forming a fluid-filled chamber for an article of footwear described above.

Clause 1. A method comprising inserting into a mold a first tool having a first surface, inserting a second tool into the first tool, the second tool including a second surface opposing and in contact with the first surface of the first tool, a third surface formed on an opposite side of the second tool than the second surface, and having a smaller wall thickness than the first tool, inserting a first sheet of material into the mold, the first sheet of material opposing the third surface of the second tool, and applying a vacuum to the first sheet of material to draw the first sheet of material into contact with the third surface of the second tool.

Clause 2. The method of Clause 1, further comprising providing the third surface with texturing.

Clause 3. The method of Clause 2, wherein drawing the first sheet of material into contact with the third surface causes the texturing to impart texturing to the first sheet of material.

Clause 4. The method of Clause 3, further comprising subjecting the first sheet of material to at least one of heat and pressure to cause the first sheet of material to retain a shape and the texturing imparted on the first sheet of material by the third surface.

Clause 5. The method of any of the preceding Clauses, further comprising subjecting the first sheet of material to at least one of heat and pressure within the mold.

Clause 6. The method of any of the preceding Clauses, wherein applying a vacuum to the first sheet of material includes drawing air through at least one of the first tool and the second tool.

Clause 7. The method of any of the preceding Clauses, further comprising printing at least one of the first tool and the second tool using a polymer material to form a portion of at least one of the first surface, the second surface, and the third surface from the polymer material.

Clause 8. The method of Clause 7, wherein printing at least one of the first tool and the second tool includes applying the polymer material to a substrate.

Clause 9. The method of Clause 8, wherein applying a polymer material to a substrate includes applying the polymer material to a substrate defining a lattice structure and/or applying the polymer material to a substrate that includes a different material than the polymer material forming the portion of the first surface, the second surface, and/or the third surface.

Clause 10. The method of any of the preceding Clauses, further comprising inserting a second sheet of material into the mold, the second sheet of material (i) opposing the first sheet of material and (ii) being joined to the first sheet of material to define a chamber having an interior void defined between and by the first sheet of material and the second sheet of material.

Clause 11. A method comprising inserting into a mold a first tool having a first surface, printing a second tool from a polymer material, and inserting the second tool into the first tool, the second tool including a second surface opposing and in contact with the first surface of the first tool, a third surface formed on an opposite side of the second tool than the second surface, and having a smaller wall thickness than the first tool.

Clause 12. The method of Clause 11, further comprising inserting a first sheet of material into the mold, the first sheet of material opposing the third surface of the second tool.

Clause 13. The method of Clause 12, further comprising applying a vacuum to the first sheet of material to draw the first sheet of material into contact with the third surface of the second tool.

Clause 14. The method of Clause 13, wherein applying a vacuum to the first sheet of material includes drawing air through at least one of the first tool and the second tool.

Clause 15. The method of any of the preceding Clauses, further comprising providing the third surface with texturing.

Clause 16. The method of Clause 15, further comprising drawing a first sheet of material into contact with the third surface to cause the texturing to impart texturing to the first sheet of material.

Clause 17. The method of Clause 16, further comprising subjecting the first sheet of material to at least one of heat and pressure to cause the first sheet of material to retain a shape and texturing imparted on the first sheet of material by the third surface.

Clause 18. The method of any of the preceding Clauses, further comprising printing the first tool from a polymer material to form the first surface from the polymer material.

Clause 19. The method of Clause 18, wherein printing at least one of the first tool and the second tool includes applying a polymer material to a substrate.

Clause 20. The method of Clause 19, wherein applying a polymer material to a substrate includes applying a polymer material to substrate defining a lattice structure and/or applying a polymer material to a substrate that is formed from a different material than a material forming the first surface.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method comprising:
   inserting into a mold a first tool having a base surface in contact with the mold and a first surface formed on an opposite side of the first tool than the base surface, a distance between the base surface and the first surface defining a thickness of the first tool, the first tool including a network of first vacuum ports that extend at least between the base surface and the first surface and are arranged to correspond with a plurality of vacuum ports arranged in the mold;
   inserting a second tool into the first tool, the second tool including a second surface opposing and in contact with the first surface of the first tool, a third surface formed on an opposite side of the second tool than the second surface, a distance between the second surface and the third surface defining a thickness of the second tool that is consistently thinner than the thickness of the first tool, the second tool including a network of second vacuum ports that extend at least between the second surface and the third surface and are arranged to correspond with the network of first vacuum ports and the plurality of vacuum ports arranged in the mold;

inserting a first sheet of material into the mold, the first sheet of material opposing the third surface of the second tool; and applying a vacuum to the first sheet of material to draw the first sheet of material into contact with the third surface of the second tool.

2. The method of claim 1, further comprising providing the third surface with texturing.

3. The method of claim 2, wherein drawing the first sheet of material into contact with the third surface causes the texturing to impart texturing to the first sheet of material.

4. The method of claim 3, further comprising subjecting the first sheet of material to at least one of heat and pressure to cause the first sheet of material to retain a shape and the texturing imparted on the first sheet of material by the third surface.

5. The method of claim 1, further comprising subjecting the first sheet of material to at least one of heat and pressure within the mold.

6. The method of claim 1, wherein applying a vacuum to the first sheet of material includes drawing air through at least one of the first tool and the second tool.

7. The method of claim 1, further comprising printing at least one of the first tool and the second tool using a polymer material to form a portion of at least one of the first surface, the second surface, and the third surface from the polymer material.

8. The method of claim 7, wherein printing at least one of the first tool and the second tool includes applying the polymer material to a substrate.

9. The method of claim 8, wherein applying a polymer material to the substrate includes applying the polymer material to a first substrate defining a lattice structure and/or applying the polymer material to a second substrate that includes a different material than the polymer material forming the portion of the first surface, the second surface, and/or the third surface.

10. The method of claim 1, further comprising inserting a second sheet of material into the mold, the second sheet of material (i) opposing the first sheet of material and (ii) being joined to the first sheet of material to define a chamber having an interior void defined between and by the first sheet of material and the second sheet of material.

11. A method comprising:

inserting into a mold a first tool having a base surface in contact with the mold and a first surface formed on an opposite side of the first tool than the base surface, a distance between the base surface and the first surface defining a thickness of the first tool, the first tool including a network of first vacuum ports arranged throughout the first tool that correspond with a plurality of vacuum ports arranged throughout the mold;

printing a second tool from a polymer material; and inserting the second tool into the first tool, the second tool including a second surface opposing and in contact with the first surface of the first tool, a third surface formed on an opposite side of the second tool than the second surface, a distance between the second surface and the third surface defining a thickness of the second tool that is consistently thinner than the thickness of the first tool, the second tool including a network of second vacuum ports arranged throughout the second tool that correspond with the network of first vacuum ports and the plurality of vacuum ports arranged throughout the mold.

12. The method of claim 11, further comprising inserting a first sheet of material into the mold, the first sheet of material opposing the third surface of the second tool.

13. The method of claim 12, further comprising applying a vacuum to the first sheet of material to draw the first sheet of material into contact with the third surface of the second tool.

14. The method of claim 13, wherein applying a vacuum to the first sheet of material includes drawing air through at least one of the first tool and the second tool.

15. The method of claim 11, further comprising providing the third surface with texturing.

16. The method of claim 15, further comprising drawing a first sheet of material into contact with the third surface to cause the texturing to impart texturing to the first sheet of material.

17. The method of claim 16, further comprising subjecting the first sheet of material to at least one of heat and pressure to cause the first sheet of material to retain a shape and texturing imparted on the first sheet of material by the third surface.

18. The method of claim 11, further comprising printing the first tool from a polymer material to form the first surface from the polymer material.

19. The method of claim 18, wherein printing at least one of the first tool and the second tool includes applying a polymer material to a substrate.

20. The method of claim 19, wherein applying the polymer material to the substrate includes applying the polymer material to a first substrate defining a lattice structure and/or applying the polymer material to a second substrate that is formed from a different material than a material forming the first surface.

* * * * *